(12) United States Patent
Perez Gonzalez et al.

(10) Patent No.: US 11,288,459 B2
(45) Date of Patent: Mar. 29, 2022

(54) ADAPTING CONVERSATION FLOW BASED ON COGNITIVE INTERACTION

(71) Applicant: INTERNATIONAL BUSINESS MACHINES CORPORATION, Armonk, NY (US)

(72) Inventors: Ignacio Perez Gonzalez, Madrid (ES); Fernando Pedrazzoli, Madrid (ES); Alejandro A. Delgado Sánchez, Madrid (ES); Ana Patricia Garcia Guerrero, Majadahonda (ES); Maria Jose Alvarez, Madrid (ES)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/744,861

(22) Filed: Jan. 16, 2020

(65) Prior Publication Data
US 2021/0034820 A1 Feb. 4, 2021

(30) Foreign Application Priority Data

Aug. 1, 2019 (EP) .................................... 19382667

(51) Int. Cl.
*G10L 15/22* (2006.01)
*G06F 40/30* (2020.01)
(Continued)

(52) U.S. Cl.
CPC ............ *G06F 40/30* (2020.01); *G06F 40/295* (2020.01); *G06N 5/02* (2013.01); *G10L 15/22* (2013.01); *G06F 40/35* (2020.01)

(58) Field of Classification Search
CPC ... G10L 15/22; G10L 2015/223; G06F 40/30; G06F 40/35
See application file for complete search history.

(56) References Cited

U.S. PATENT DOCUMENTS

| 9,183,833 | B2 | 11/2015 | Runge et al. |
| 2005/0069122 | A1* | 3/2005 | Lin ..................... H04M 3/5183 379/265.01 |

(Continued)

FOREIGN PATENT DOCUMENTS

| CN | 107870994 A | 4/2018 |
| WO | WO2018071274 A1 | 4/2018 |
| WO | WO2018215825 A1 | 11/2018 |

OTHER PUBLICATIONS

"Agents," Dialogflow Documentation, Google Cloud, https://cloud.google.com/dialogflow/docs/agents-overview, Jul. 2, 2019, pp. 1.

(Continued)

*Primary Examiner* — Jialong He
(74) *Attorney, Agent, or Firm* — Michael A. Petrocelli, Esq.; Blanche E. Schiller, Esq.; Heslin Rothenberg Farley & Mesiti P.C.

(57) ABSTRACT

Conversation flow is adapted based on user interactions in a cognitive interaction between a user and a machine carried out at a gateway to a cognitive interaction service. A series of cognitive interactions are received during a conversation flow. A determination is made that a pattern of user cognitive interactions meets a defined pattern and that a plurality of machine responses meets a defined threshold of a maximum repetition of responses to the defined pattern. An indication is provided to the cognitive interaction service to adapt a type of subsequent response according to a defined action for the defined pattern.

20 Claims, 6 Drawing Sheets

(51) Int. Cl.
*G06F 40/295* (2020.01)
*G06N 5/02* (2006.01)
*G06F 40/35* (2020.01)

(56) References Cited

U.S. PATENT DOCUMENTS

| | | | |
|---|---|---|---|
| 2010/0124325 A1* | 5/2010 | Weng | G10L 15/22 |
| | | | 379/265.11 |
| 2013/0325482 A1 | 12/2013 | Tzirkel-Hancock | |
| 2015/0309988 A1 | 10/2015 | Allen et al. | |
| 2017/0162197 A1 | 6/2017 | Cohen | |
| 2018/0089572 A1 | 3/2018 | Aili et al. | |
| 2018/0174055 A1 | 6/2018 | Tirumale et al. | |
| 2020/0005118 A1* | 1/2020 | Chen | G06N 3/006 |

OTHER PUBLICATIONS

"What Is Language Understanding (LUIS)?" https://docs.microsoft.com/en-us/azure/cognitive-services/luis/home, Nov. 21, 2019, pp. 1-5.

Mell, Peter and Tim Grance, "The NIST Definition of Cloud Computing," National Institute of Standards and Technology, Information Technology Laboratory, Special Publication 800-145, Sep. 2011, pp. 1-7.

"Creating Entities", https://cloud.ibm.com/docs/assistant?topic_assistant-entities, Last Updated: Mar. 2020, pp. 1-24.

\* cited by examiner

ADAPTING CONVERSATION FLOW BASED ON COGNITIVE INTERACTION

BACKGROUND

One or more aspects of the present invention relate to cognitive interaction between a user and a machine, and more specifically, to adapting conversation flow based on the cognitive interaction.

Various different cognitive interaction engines are known in which a question-answering service is provided to a human user posing questions in natural language. The service seeks to understand a question and returns a precise answer to the question.

One example is the IBM Watson Assistant of International Business Machines Corporation. (IBM and IBM Watson are trademarks or registered trademarks of International Business Machines Corporation in at least one jurisdiction.) The IBM Watson system parses questions into different keywords and sentence fragments in order to find statistically related phrases. The IBM Watson Assistant service is an offering for building conversational interfaces into any application, device, or channel.

Cognitive interaction engines allow systems to be built that can understand intents and entities of the different messages the user provides while maintaining a conversation.

The cognitive interaction engines follow rules in the conversation flow that are defined during the design phase.

Techniques are known which identify the main topics and subtopics of a conversation to improve the interaction, generating interactive content that fits the topics covered.

Another known technique provides a way to improve communication with virtual assistants by creating blocks of words that match the different variations that may exist to improve the understanding of natural language.

SUMMARY

Shortcomings of the prior art are overcome and additional advantages are provided through the provision of a computer-implemented method of adapting conversation flow. The computer-implemented method includes receiving a series of cognitive interactions between a user and a machine during a conversation flow. A determination is made that a pattern of user cognitive interactions meets a defined pattern and that a plurality of machine responses meets a defined threshold of a maximum repetition of responses to the defined pattern. An indication is made to a cognitive interaction service to adapt a type of subsequent response based on a defined action for the defined pattern.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

One or more aspects of the present invention relate to the field of cognitive interaction between a user (e.g., a human) and a machine and in particular correspond to a vocal conversation, which includes intents and entities between a user and a machine. Intents and entities of a given interaction allow a conversation flow to be created in order to provide useful information for the user. An intent is, for instance, a probability of a possible purpose of the user's input, and an entity provides a specific context for an intent. The cognitive interaction between a human and a machine may be referred to herein as a human-machine cognitive interaction.

In one embodiment, a conversation flow between the user and the machine and the interaction including the way the user interacts with the cognitive machine during a conversation (referred to as a behavior or conduct) are monitored. When the interactions by the user comply with a predefined pattern, this is recognized as a particular behavior. The response of the machine to the user interaction (e.g., behavior) is also monitored in the conversation flow and subsequent responses are adapted accordingly.

One or more aspects of the described method, system and computer program product have the capability to define the principles (e.g., behavior principles) that are used to rule the conversation flow. Instead of conducting the conversation flow by means of a fixed set of rules defined in the system, the conversation is conducted based on principles (a.k.a., behavior principles) according to the different interactions (including behaviors) the users may have.

Figure 1:
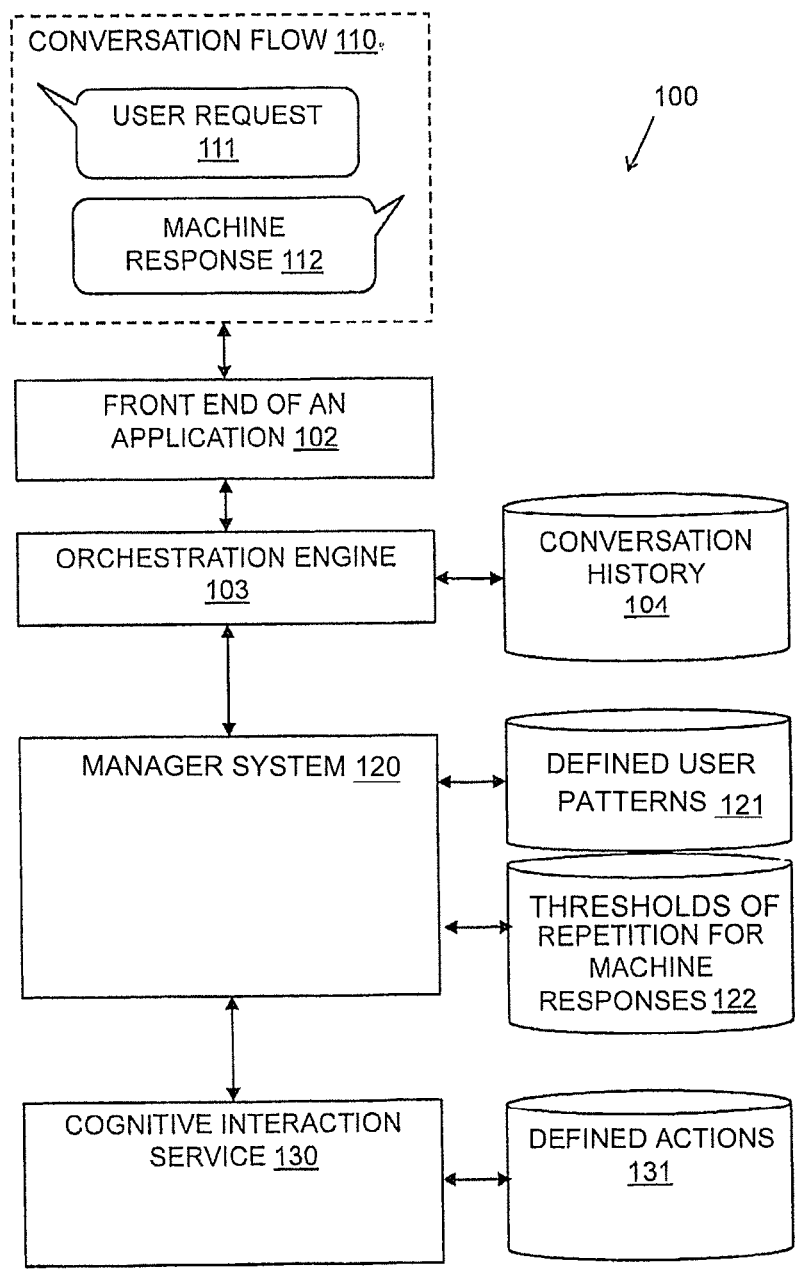
FIG. 1 is a schematic diagram of an example embodiment of a system in which a method in accordance with one or more aspects of the present invention may be implemented.

Referring to FIG. 1, a block diagram shows an example embodiment of a system 100 in which one or more aspects of the present invention may be implemented.

A front end 102 of an application is provided that is responsible for receiving a user's request 111 and sending it to an orchestration engine 103 as an application programming interface (API) call. The front end 102 also returns a machine response 112 to the user coming from the orchestration engine 103 and modulates it depending on the communication channel. The user requests 111 and machine responses 112 build up a conversation flow 110.

An example of a front end 102 is a chatbot. An example chatbot may be created using an asynchronous event driven JavaScript runtime environment using a cognitive interaction service 130 that builds, tests and deploys a bot or virtual agent across mobile devices, messaging platforms, etc. (Java and all Java-based trademarks and logos are trademarks or registered trademarks of Oracle and/or its affiliates.)

The orchestration engine 103 is a piece of infrastructure that is responsible for receiving the user request 111 from the front end 102, abstracted from the channel, as an API invocation. The orchestration engine 103 coordinates calls to different service APIs and returns the machine response 112 to the channel of the front end 102.

The orchestration engine 103 may add a layer of customization to communications between the front end 102 and the cognitive interaction service 130. The orchestration engine 103 may act as a proxy for the cognitive interaction service 130 intercepting message requests and responses and modifying them by using third-party APIs.

The orchestration engine 103 may store the history of conversations in a repository 104.

A cognitive interaction service 130 may be provided that is responsible for managing the conversation between the user (e.g., human) and the machine. Some examples of cognitive interaction services include: the IBM Watson system of International Business Machines Corporation, the Language Understanding Intelligent Service (LUIS) of Microsoft Corporation, or Dialogflow of Google Inc.

In a cognitive interaction service 130, the flow may be enhanced by using additional services. For example, the IBM Watson Natural Language Understanding service may be used to identify entities and the IBM Watson Tone Analyzer service may be used to analyze data relating to the user's interactions and to detect that the data fits a psychological profile (e.g., one or more emotions). The user voluntarily agrees to participate in this service (and may opt-out) and to have data collected and have its privacy maintained. For frequently asked questions (FAQ), a call to the IBM Watson Discovery service may use passage retrieval to pull answers from a collection of documents.

The IBM Watson Discovery service is a cognitive search and content analytics engine for applications to identify patterns, trends and actionable insights. The IBM Watson Natural Language Understanding service analyzes text to extract metadata from content such as concepts, entities, keywords, categories, sentiment, emotion, relations, and semantic roles, using natural language understanding. The IBM Watson Tone Analyzer service uses linguistic analysis to detect communication tones in written text. These services may be provided via cloud services.

A manager system 120 (e.g., a behavior manager system) is provided that detects the way the user interacts (e.g., behavior) and, in a case of detecting a previously defined pattern (e.g., defined behavior pattern) and a defined number of responses by the machine, indicates to the cognitive interaction service 130 how it should respond. The manager system 120 may reference repositories of defined user patterns 121 (e.g., defined user behavior patterns) and thresholds for repetition of machine responses 122 to the patterns 121. The cognitive interaction service 130 may have a repository of defined actions 131 that may be carried out when the manager system 120 indicates a specific response to a pattern (e.g., behavior pattern).

The user may start an interaction with the cognitive interaction service 130 through the front end 102 of an application. The message of the user request 111 may be forwarded by an orchestration engine 103 to the cognitive interaction service 130 and may be stored in the repository 104 of the conversation history. Before getting to the cognitive interaction service 130, the message passes through the described manager system 120. The manager system 120 determines if the user's interaction (e.g., behavior) is identified with any of the previously defined patterns 121 and, if so, is responsible for indicating to the cognitive interaction service 130 how to treat it.

Figure 2:
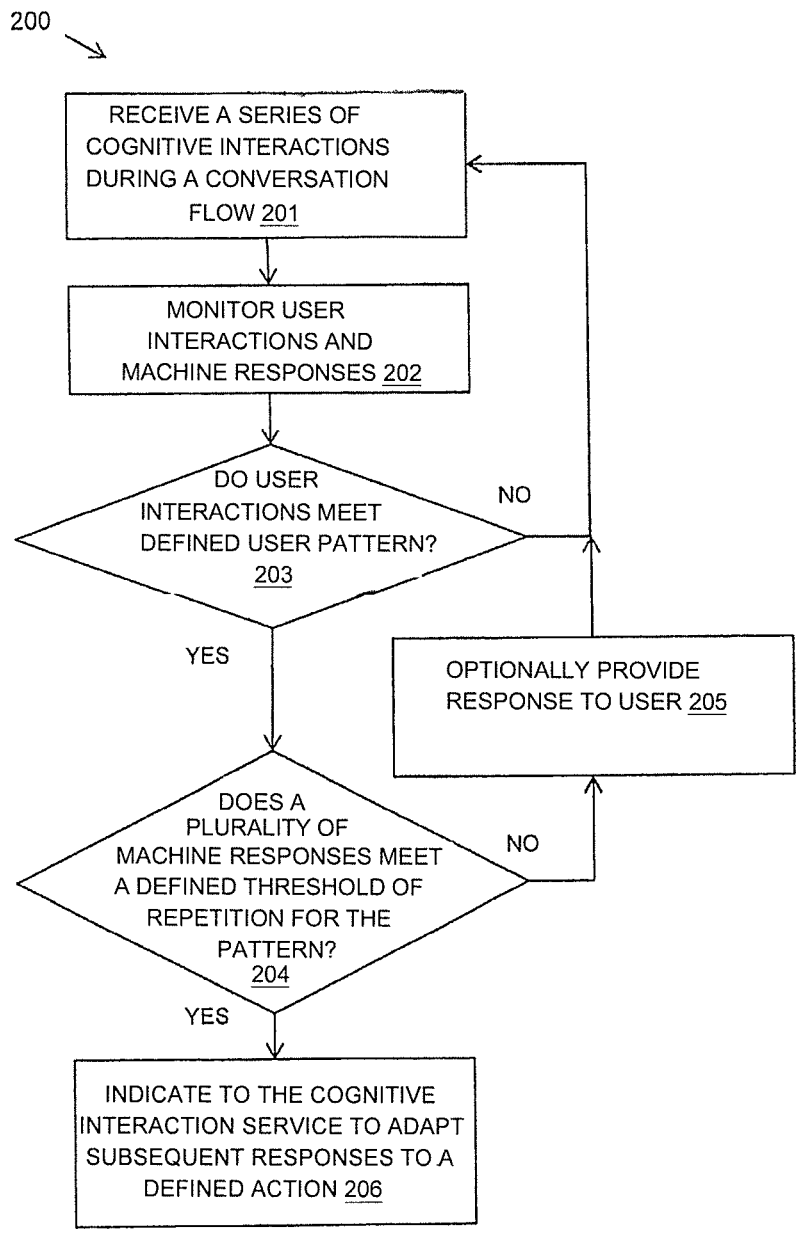
FIG. 2 is a flow diagram of an example embodiment of a method in accordance with one or more aspects of the present invention.

Referring to FIG. 2, a flow diagram 200 shows an example embodiment of one or more aspects of the described method as carried out by a manager system 120 of FIG. 1.

The manager system 120 may receive 201 a series of cognitive interactions between a user and a machine during a conversation flow and may monitor 202 the user interaction (e.g., behavior) and the machine responses.

It may be determined 203 if the user interactions meet a defined user pattern (e.g., defined user behavior pattern). This may be carried out by applying rules identifying the defined user pattern. If no pattern is matched, the method may continue to receive 201 and monitor 202 the conversation flow.

If a pattern is matched, the method may determine 204 if a plurality of machine responses meets a defined threshold of a maximum repetition for the matched pattern. If the defined threshold is not met, the method may optionally provide 205 a response to the user addressing the behavior, and the method may continue to receive 201 and monitor 202 the conversation flow to determine if the behavior continues.

If the defined threshold is met, the manager system 120 may indicate to a cognitive interaction service (e.g., cognitive interaction service 130) to adapt 206 subsequent responses to a defined action.

The following table shows some example defined user patterns, response thresholds, and example actions.

| USER INTERACTION | RESPONSE THRESHOLD | ACTION |
| --- | --- | --- |
| Forbidden words | Number of responses [3] | Jump to [digression-id] |
| Word/phrase repetition | Number of responses [3] | Jump to [digression-id] |
| Minimum length | Number of responses [2] | Option [go to node/ repeat question] |
| Maximum length | Number of responses [2] | Option [go to node/ repeat question] |
| Psychological profile level [0, 8] | Number of responses [3] | Go to node [node_id] |

The first column defines user patterns that may be detected in the user contribution to the conversation flow. The second column defines a maximum number of repetitions of responses received from the machine interaction. The third column defines an action that is instructed to be carried out if the maximum number of responses allowed for a pattern is met. The action may include, for example, jumping to a node or a digression.

Various user patterns may be defined for conversation flows. The above table shows some example defined user patterns. The user patterns may be defined by rules identifying aspects of a user interaction (e.g., behavior) that indicate the defined user pattern.

A rule may be defined to recognize prohibited words by a user. The defined user interaction may look for prohibited vocabulary, and the capability enables such a conversation flow to be handled in a specific way.

A rule may be defined so that the same topic is not repeated more than a defined number of times in a single interaction. This may be identified by repeated words or phrases in the user interaction.

A rule may be defined to recognize when a customer gives a short answer when an explanation is required (for example, "yes" or "no" when an explanation is needed) or when a customer gives a long answer when a concise answer is needed. Response length may be used as a metric for whether a response is an explanation or a concise response.

A rule may be defined to detect the user's tone. This may be identified using a tone detection tool.

Other rules, not shown in the table, may be defined including the user of invented words or invalid sentences.

The user inputs that fall within a pattern may not be exactly the same inputs in each instance, but they may illicit the same response by the machine. Therefore, the described capability counts the number of responses for the defined user pattern and determines when the number of responses meets a defined threshold. When the defined threshold is met, an action may be configured as required or indicated by the cognitive interaction service. This gives a buffer of a defined number of responses to the user interaction before an action is taken.

The capability does not require the exact same user input to be repeated. A varying user interaction that falls in a same rule is recognized by the repeated response and an action is taken.

The action that is taken may be defined. In the above table, the following are given as examples.

The action may jump to a digression. A digression is a context change in a temporal way. Digressions allow for the user to break away from a dialog branch in order to temporarily change the topic before returning to the original dialog flow.

The following is an example of a digression:
User: I would like a contract for a new credit card.
Machine: Perfect, what is your name?
User: User 1
Machine: And your address?
User: Location 1.
Machine: Do you have any preferred color?
User: Color 1.
Machine: And what limit do you choose?
User: I lost my previous card ═>>>>> This is something important for both sides that needs handling and will activate a digression.
Machine: Perfect, as soon as we finish this, we will look into it ═>>>>> This shows interest.
Machine: What is the required limit? ═>>>>> Continues the original flow
User: $xxx
Machine: Perfect we will send your card.
Machine: Where do you think you lost your card, maybe someone is using it? ═>>>>> This starts the digression.

In this example, the digression_id="stolen_card" and the node_id=" contract intent".

In an industrialized environment, it is common practice to have different chatbots that each understands a specific topic. In the described aspects, the concept of behavior principles is introduced which helps define how chatbots should respond that may be applied across chatbots of different topics.

One of the advantages of one or more aspects is that all the conversations are governed by the same rules, regardless of the developer. This way, all conversations have a standard structure, e.g., behavior structure. Having conversations that follow the same structure is beneficial in order to work on them, bearing in mind that there may be different people working on the same project. Having a series of common rules simplifies the work when it comes to understanding the structure that follows the dialogue.

Figure 3:
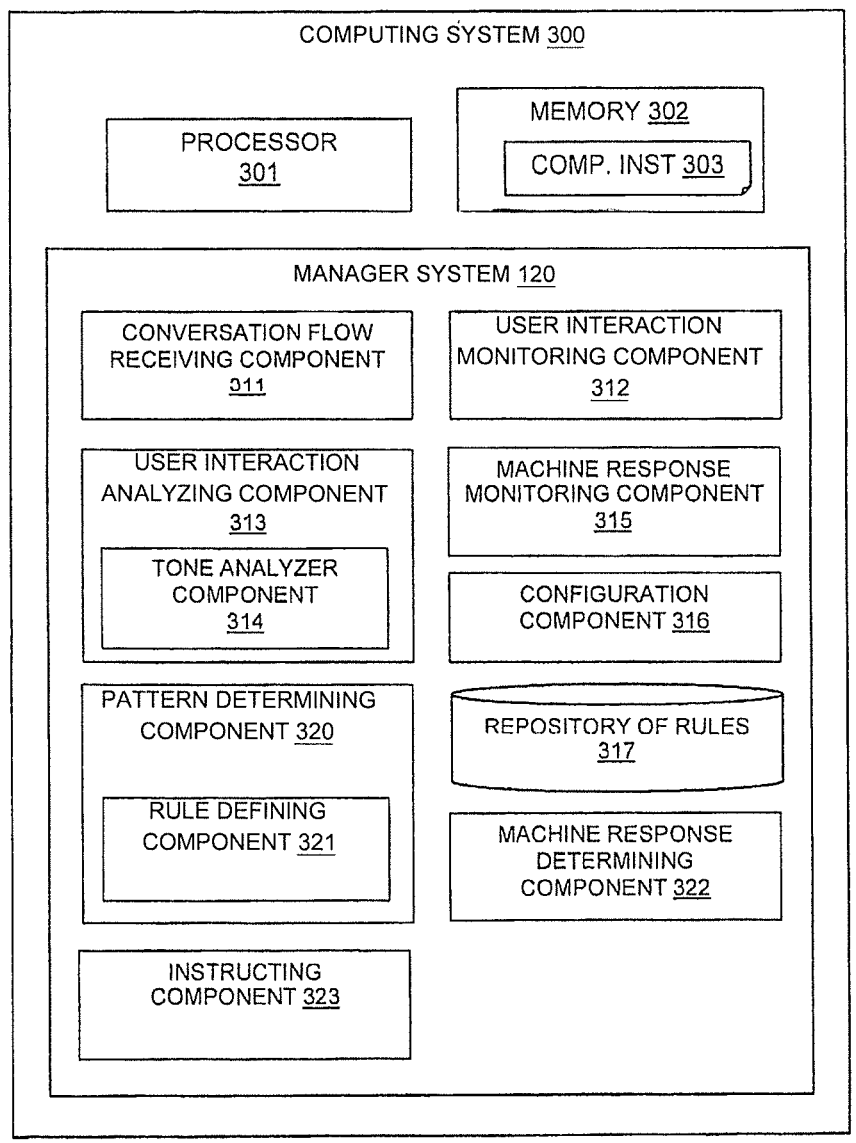
FIG. 3 is a block diagram of an example embodiment of a system in accordance with one or more aspects of the present invention.

Referring to FIG. 3, an example embodiment of the described system is shown in the form of a manager system 120, which acts as a gateway to one or more cognitive interaction services, and provided in a computing system 300.

The computing system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The manager system 120 may include a conversation flow receiving component 311 for receiving a series of cognitive interactions between a user and a machine during a conversation flow. The cognitive interactions of a conversation flow may be coordinated as calls from a front end (e.g., front end 102) of an application such as a chatbot.

The manager system 120 may include a user interaction monitoring component 312 for monitoring the user cognitive interactions and a user interaction analyzing component 313 for analyzing the cognitive interactions to determine the user behavior. The user interaction analyzing component 313 may include a tone analyzer component 314 for analyzing the tone of an interaction. The tone analyzer component 314 may access remote analyzer services.

The manager system 120 may include a machine response monitoring component 315 for monitoring the machine responses and counting repetitions of responses in a conversation flow.

The manager system 120 may include a pattern determining component 320 for determining that a pattern of the user cognitive interactions meets a defined pattern. The pattern determining component 320 may include a rule defining component 321 (e.g., a behavior rule defining component) for configuring defined patterns by providing rules to identify the pattern in the user cognitive interactions.

The manager system 120 may include a configuration component 316 for configuring a set of defined patterns (e.g., defined behavior patterns) with each defined pattern having a threshold of maximum repetition of responses and a defined action to be carried out by the cognitive interaction service (e.g., cognitive interaction service 130). The manager system 120 may include a repository 317 for storing the configuration rules and pattern defining rules.

The manager system 120 may include a machine response determining component 322 for determining that a plurality of the machine responses meets a defined threshold of a maximum repetition of responses to the defined pattern.

The manager system 120 may include an instructing component 323 for indicating to the cognitive interaction service (e.g., cognitive interaction service 130) to adapt the type of subsequent responses according to a defined action for the defined pattern.

Figure 4:
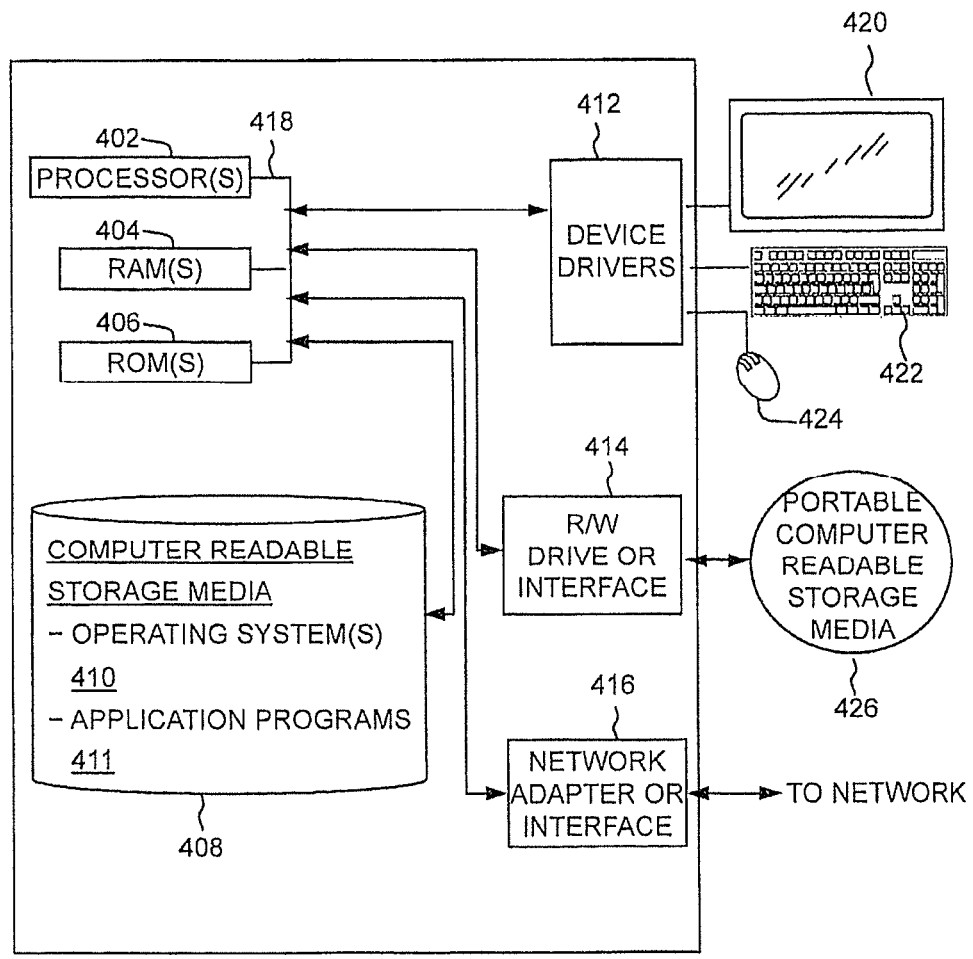
FIG. 4 is a block diagram of an embodiment of a computer system or cloud server in which one or more aspects of the present invention may be implemented.

FIG. 4 depicts a block diagram of components of the computing system 300 of FIG. 3, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing system 300 can include one or more processors 402, one or more computer-readable random access memories (RAMs) 404, one or more computer-readable read-only memories (ROMs) 406, one or more computer readable storage media 408, device drivers 412, a read/write (R/W) drive or interface 414, and a network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410 and application programs 411, such as the manager system 120, are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM (compact disc read-only memory), DVD (digital versatile disk), memory stick, magnetic tape, magnetic disk, optical disk, a semiconductor storage device such as RAM, ROM, EPROM (erasable programmable read-only memory), flash memory, or any other computer readable storage media that can store a computer program and digital information, in accordance with embodiments of the invention.

Computing system 300 can also include a R/W drive or interface 414 to read from and write to one or more portable computer readable storage media 426. Application programs 411 on computing system 300 can be stored on one or more of the portable computer readable storage media 426, read via the respective R/W drive or interface 414 and loaded into the respective computer readable storage media 408.

Computing system 300 can also include a network adapter or interface 416, such as a TCP/IP adapter card or wireless communication adapter. Application programs 411 on computing system 300 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing system 300 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

According to an aspect of the present invention, there is provided a computer-implemented method for adapting conversation flow based on user behavior in a human-machine cognitive interaction carried out at a gateway to a cognitive interaction service. The computer-implemented method includes receiving a series of human-machine cognitive interactions during a conversation flow; determining that a behavior pattern of the human cognitive interactions meets a defined behavior pattern; determining that a plurality of machine responses meets a defined threshold of a maximum repetition of responses to the defined behavior pattern; and indicating to the cognitive interaction service to adapt a type of subsequent response according to a defined action for the defined behavior pattern.

According to another aspect of the present invention, there is provided a system for adapting conversation flow based on user behavior in a human-machine cognitive interaction, the system being a gateway to a cognitive interaction service. The system includes a processor and a memory configured to provide computer program instructions to the processor to execute the function of the components: a conversation flow receiving component for receiving a series of human-machine cognitive interactions during a conversation flow; a behavior pattern determining component for determining that a behavior pattern of the human cognitive interactions meets a defined behavior pattern; a machine response determining component for determining that a plurality of machine responses meets a defined threshold of a maximum repetition of responses to the defined behavior pattern; and an instructing component for indicating to the cognitive interaction service to adapt a type of subsequent response according to a defined action for the defined behavior pattern.

According to a further aspect of the present invention, there is provided a computer program product for adapting conversation flow based on user behavior in a human-machine cognitive interaction. The computer program product includes a computer readable storage medium having program instructions embodied therewith. The program instructions are executable by a processor to cause the processor to: receive a series of human-machine cognitive interactions during a conversation flow; determine that a behavior pattern of the human cognitive interactions meets a defined behavior pattern; determine that a plurality of machine responses meets a defined threshold of a maximum repetition of responses to the defined behavior pattern; and indicate to the cognitive interaction service to adapt a type of subsequent response according to a defined action for the defined behavior pattern.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
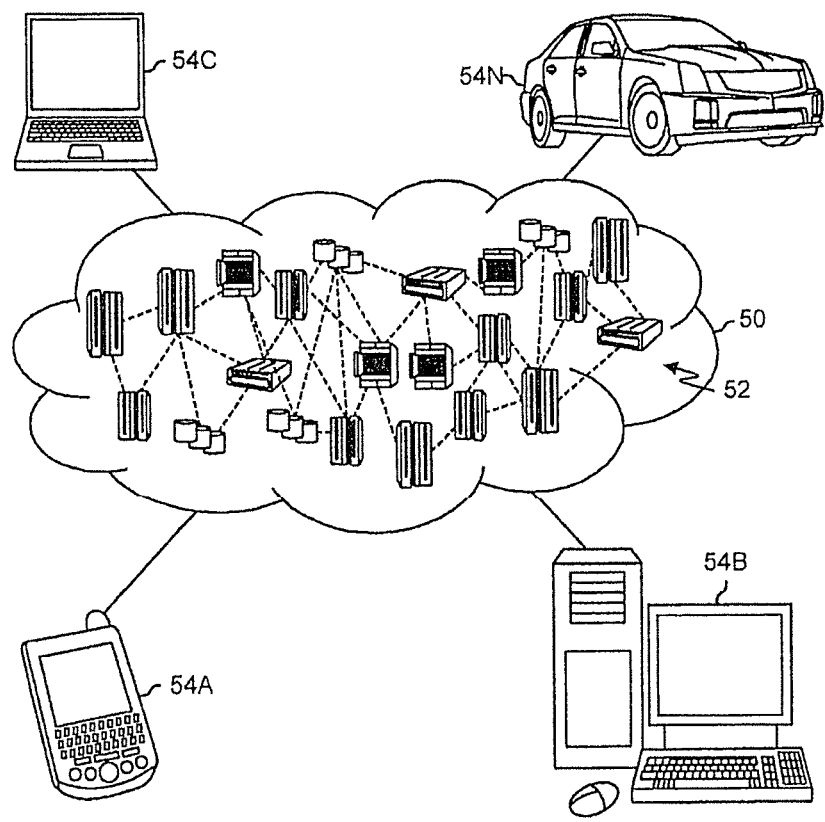
FIG. 5 is a schematic diagram of a cloud computing environment in which one or more aspects of the present invention may be implemented.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
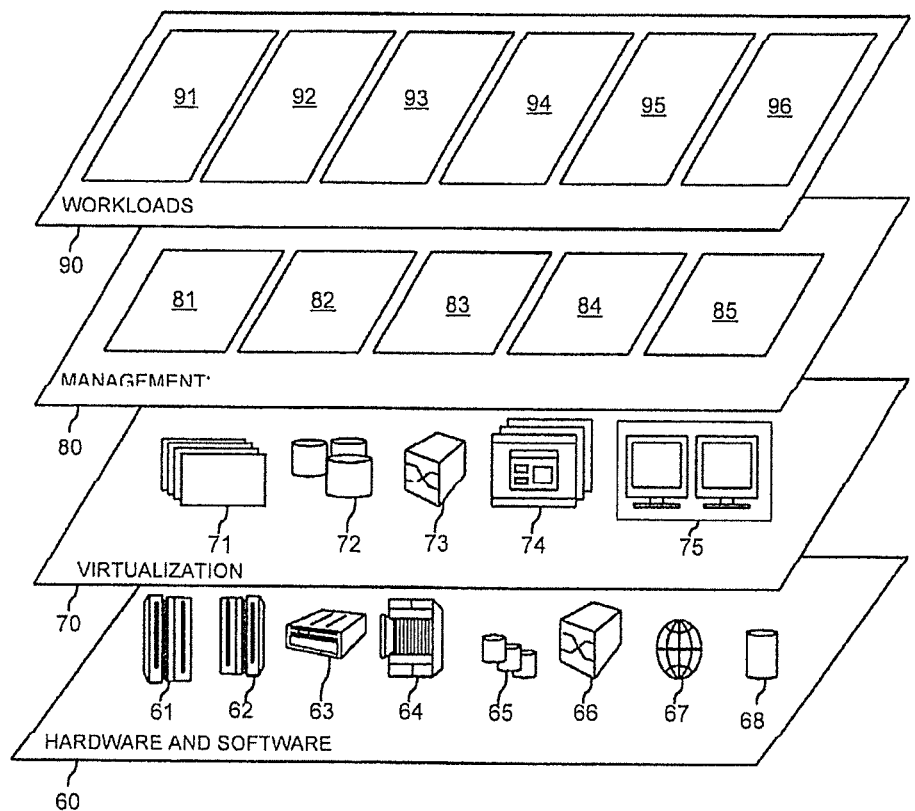
FIG. 6 is a diagram of abstraction model layers of a cloud computing environment in which one or more aspects of the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and human-machine cognitive interaction processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A computer-implemented method of adapting conversation flow, said computer-implemented method comprising:
   receiving a series of cognitive interactions between a user and a machine during a conversation flow;
   determining that a pattern of user cognitive interactions meets a defined pattern;
   determining that a plurality of machine responses meets a defined threshold of a maximum repetition of responses to the defined pattern, wherein the defined threshold of the maximum repetition of responses is based on the defined pattern; and
   indicating to a cognitive interaction service to adapt a type of subsequent response based on a defined action for the defined pattern.

2. The computer-implemented method of claim 1, further including configuring a plurality of defined patterns by providing rules to identify the pattern in the user cognitive interactions.

3. The computer-implemented method of claim 2, further including monitoring the user cognitive interactions and analyzing the user cognitive interactions to determine whether the user cognitive interactions meet a rule identifying the defined pattern.

4. The computer-implemented method of claim 3, wherein the analyzing the user cognitive interactions includes analyzing a tone of an interaction of the user cognitive interactions.

5. The computer-implemented method of claim 2, wherein the rules include one or more of a group comprising: use of forbidden words, word or phrase repetition, analysis and detection of a threshold level of a particular psychological profile, and a user interaction length.

6. The computer-implemented method of claim 1, further including monitoring one or more machine responses of the plurality of machine responses and counting repetitions of machine responses in the conversation flow.

7. The computer-implemented method of claim 1, further including configuring, for the defined pattern, the defined threshold of the maximum repetition of responses and the defined action to be carried out by a cognitive interaction service, wherein the defined threshold of the maximum repetition of responses is one threshold for the defined pattern and a different threshold for another defined pattern.

8. The computer-implemented method of claim 1, wherein the defined action is to go to an identified node or digression of a cognitive interaction service.

9. The computer-implemented method of claim 1, further including:
   determining that the plurality of machine responses does not meet the defined threshold of the maximum repetition of responses to the defined pattern; and
   providing a default response to the defined pattern.

10. A computer system for adapting conversation flow, said computer system comprising:
    a memory; and
    a processor in communication with the memory, wherein the computer system is configured to perform a method, said method comprising:
      receiving a series of cognitive interactions between a user and a machine during a conversation flow;
      determining that a pattern of user cognitive interactions meets a defined pattern;
      determining that a plurality of machine responses meets a defined threshold of a maximum repetition of responses to the defined pattern, wherein the defined threshold of the maximum repetition of responses is based on the defined pattern; and
      indicating to a cognitive interaction service to adapt a type of subsequent response based on a defined action for the defined pattern.

11. The computer system of claim 10, wherein the method further comprises configuring a plurality of defined patterns by providing rules to identify the pattern in the user cognitive interactions.

12. The computer system of claim 11, wherein the method further comprises monitoring the user cognitive interactions and analyzing the user cognitive interactions to determine whether the user cognitive interactions meet a rule identifying the defined pattern.

13. The computer system of claim 10, wherein the method further comprises monitoring one or more machine responses of the plurality of machine responses and counting repetitions of machine responses in the conversation flow.

14. The computer system of claim 10, wherein the method further comprises configuring, for the defined pattern, the defined threshold of the maximum repetition of responses and the defined action to be carried out by a cognitive interaction service, wherein the defined threshold of the maximum repetition of responses is one threshold for the defined pattern and a different threshold for another defined pattern.

15. The computer system of claim 10, wherein the method further comprises:
    determining that the plurality of machine responses does not meet the defined threshold of the maximum repetition of responses to the defined pattern; and
    providing a default response to the defined pattern.

16. A computer program product for adapting conversation flow, said computer program product comprising:
    at least one computer readable storage medium readable by at least one processing circuit and storing instructions for performing a method comprising:

receiving a series of cognitive interactions between a user and a machine during a conversation flow;

determining that a pattern of user cognitive interactions meets a defined pattern;

determining that a plurality of machine responses meets a defined threshold of a maximum repetition of responses to the defined pattern, wherein the defined threshold of the maximum repetition of responses is based on the defined pattern; and indicating to a cognitive interaction service to adapt a type of subsequent response based on a defined action for the defined pattern.

17. The computer program product of claim 16, wherein the method further comprises configuring a plurality of defined patterns by providing rules to identify the pattern in the user cognitive interactions.

18. The computer program product of claim 17, wherein the method further comprises monitoring the user cognitive interactions and analyzing the user cognitive interactions to determine whether the user cognitive interactions meet a rule identifying the defined pattern.

19. The computer program product of claim 16, wherein the method further comprises configuring, for the defined pattern, the defined threshold of the maximum repetition of responses and the defined action to be carried out by a cognitive interaction service, wherein the defined threshold of the maximum repetition of responses is one threshold for the defined pattern and a different threshold for another defined pattern.

20. The computer program product of claim 16, wherein the method further comprises:

determining that the plurality of machine responses does not meet the defined threshold of the maximum repetition of responses to the defined pattern; and providing a default response to the defined pattern.

* * * * *